US005272877A

United States Patent [19]

Fukushima et al.

[11] Patent Number: 5,272,877

[45] Date of Patent: Dec. 28, 1993

[54] METHOD AND APPARATUS FOR CONTROLLING SWING STOP OF UPPER SWING BODY IN CONSTRUCTION MACHINE

[75] Inventors: Kouichi Fukushima, Kobe; Hideaki Yoshimatsu, Akashi, both of Japan

[73] Assignee: Kabushiki Kaisha Kobe Seiko Sho, Kobe, Japan

[21] Appl. No.: 777,163

[22] Filed: Oct. 16, 1991

[30] Foreign Application Priority Data

Oct. 18, 1990 [JP] Japan ................................ 2-281116

[51] Int. Cl.[5] ............................................ F16D 31/00

[52] U.S. Cl. ........................................ 60/327; 60/466; 60/468; 91/459

[58] Field of Search ................. 60/327, 328, 459, 460, 60/466, 494, 468; 91/508, 511, 517, 518, 459

[56] References Cited

U.S. PATENT DOCUMENTS

| | | | |
|---|---|---|---|
| 3,921,818 | 11/1975 | Yamagishi | 212/132 |
| 4,367,806 | 1/1983 | Ramquist | 60/460 X |
| 4,520,625 | 6/1985 | Sato et al. | 60/494 X |
| 5,062,266 | 11/1991 | Yoshimatsu | 60/494 X |
| 5,063,742 | 11/1991 | Yoshimatsu | 60/468 X |
| 5,111,658 | 5/1992 | Strenzke et al. | 60/466 X |
| 5,136,928 | 8/1992 | Hachisu | 91/459 X |

FOREIGN PATENT DOCUMENTS

| | | |
|---|---|---|
| 2421613 | 11/1974 | Fed. Rep. of Germany . |
| 3513007 | 12/1985 | Fed. Rep. of Germany . |
| 2436745 | 4/1980 | France . |
| 2461676 | 2/1981 | France . |
| 2571867 | 4/1986 | France . |

*Primary Examiner*—Edward K. Look
*Assistant Examiner*—Hoang Nguyen
*Attorney, Agent, or Firm*—Oblon, Spivak, McClelland, Maier & Neustadt

[57] ABSTRACT

Herein described is a method and apparatus for controlling braking and stopping of the slewing of an upper slewing body which is slewingably provided on a construction and hoists a load, represented by a rotary crane, wherein the braking torque for braking the upper slewing body and the braking torque for braking a hoisting load are separately obtained by the calculated slewing angular acceleration, and the whole braking torque is calculated on the basis of both the braking torques, thereby achieving a high accurate control of the slewing stop.

2 Claims, 6 Drawing Sheets

METHOD AND APPARATUS FOR CONTROLLING SWING STOP OF UPPER SWING BODY IN CONSTRUCTION MACHINE

BACKGROUND OF THE INVENTION

1. Field of the Invention

The present invention relates to a method and apparatus for controlling braking and stopping of the slewing of the upper slewing body which is slewingably provided on a construction machine.

2. Description of the Prior Art

It is important to satisfactorily brake and stop the slewing of the upper slewing body provided on a construction machine represented by a rotary crane. Conventionally, such a slewing stop action has been manually operated by a skilled operator, and therefore, there has been posed a great task to reduce a burden of the operator and secure a reliable safety.

Recently, there have been proposed various means for automatically braking and stopping the slewing of the above upper slewing body.

For example, Japanese Patent Laid Open No. Sho 62-13619 publication discloses an apparatus for detecting an angular inertia moment of an upper slewing body and controlling a slewing braking force on the basis of the detected result. Furthermore, Japanese Utility Model Laid Open No. Sho 61-197089 publication discloses an apparatus for calculating an inertia moment of a boom (upper slewing body) from various detection signals and performing the automatic control of a slewing stop on the basis of the calculated inertia moment and present slewing speed.

Both the above-mentioned conventional apparatuses merely pay attention to the inertia moment and deceleration of the whole upper slewing body to control the braking torque and effect the automatic stop. However, the hoisting load is oscillated in the oscillating direction with respect to the upper slewing body during the actual slewing braking, and movement of the slewing body is not always coincident with that of the hoisting load. Such an oscillation of the hoisting load results in pulling the upper slewing body during the slewing braking, whereby there occurs a difference between a theoretical deceleration and an actual deceleration, thus impairing accuracy of the slewing control. For example, in the case that there is attempted such a control as to completely stop the slewing in the state that the oscillation of the hoisting load does not finally remain, there possibly remains an oscillation of a hoisting load by an error caused by the oscillation of the load at the time of actual stop. Such an error of control becomes significant as the weight of the hoisting load increases.

SUMMARY OF THE INVENTION

It is therefore an object of the present invention to provide a method and apparatus capable of controlling a slewing stop with accuracy even in the case that a load is hoisted on an upper slewing body.

According to the present invention, there is provided a method for controlling a slewing stop of an upper slewing body which is slewingably provided on a construction machine and hoists a load at a predetermined position, the method comprising the steps of: calculating a slewing angular acceleration for realizing the desired control of a slewing stop, calculating a braking torque of the upper slewing body required for braking the upper slewing body on the basis of the slewing angular acceleration, calculating a hoisting load braking torque required for braking the hoisting load on the basis of the above slewing angular acceleration and an oscillating state of the hoisting load during the slewing braking, and thus applying a brake on the basis of both the braking torques.

In the present invention, there is further provided an apparatus for controlling a slewing stop of an upper slewing body which is slewingably provided on a construction machine and hoists a load at a predetermined position, the apparatus comprising a slewing angular acceleration calculation means for calculating a slewing angular acceleration for realizing the desired control of a slewing stop, a braking torque calculation means for calculating a braking torque on the basis of the slewing angular acceleration, and a control means for performing the control of a slewing stop of the upper slewing body on the basis of the above braking torque, wherein the above braking torque calculation means comprises an upper slewing body braking torque calculation means for calculating the braking torque of the upper slewing body required for braking the upper slewing body on the basis of the above slewing angular acceleration, a hoisting load braking torque calculation means for calculating a hoisting load braking torque required for braking the hoisting load on the basis of the above slewing angular acceleration and an oscillating state of the hoisting load during the slewing braking, and a whole braking torque calculation means for calculating the actual braking torque from both the braking torques.

With the above-mentioned constitution, the torque required for braking the upper slewing body and the torque required for braking the hoisting load are separately calculated, and the actual braking torque is calculated from both the braking torques in consideration of the oscillating state of the hoisting load.

BRIEF DESCRIPTION 0 THE DRAWINGS

DETAILED DESCRIPTION OF THE PREFERRED EMBODIMENTS

The exemplary embodiment of the present invention will be described with reference to the drawings.

Figure 8:
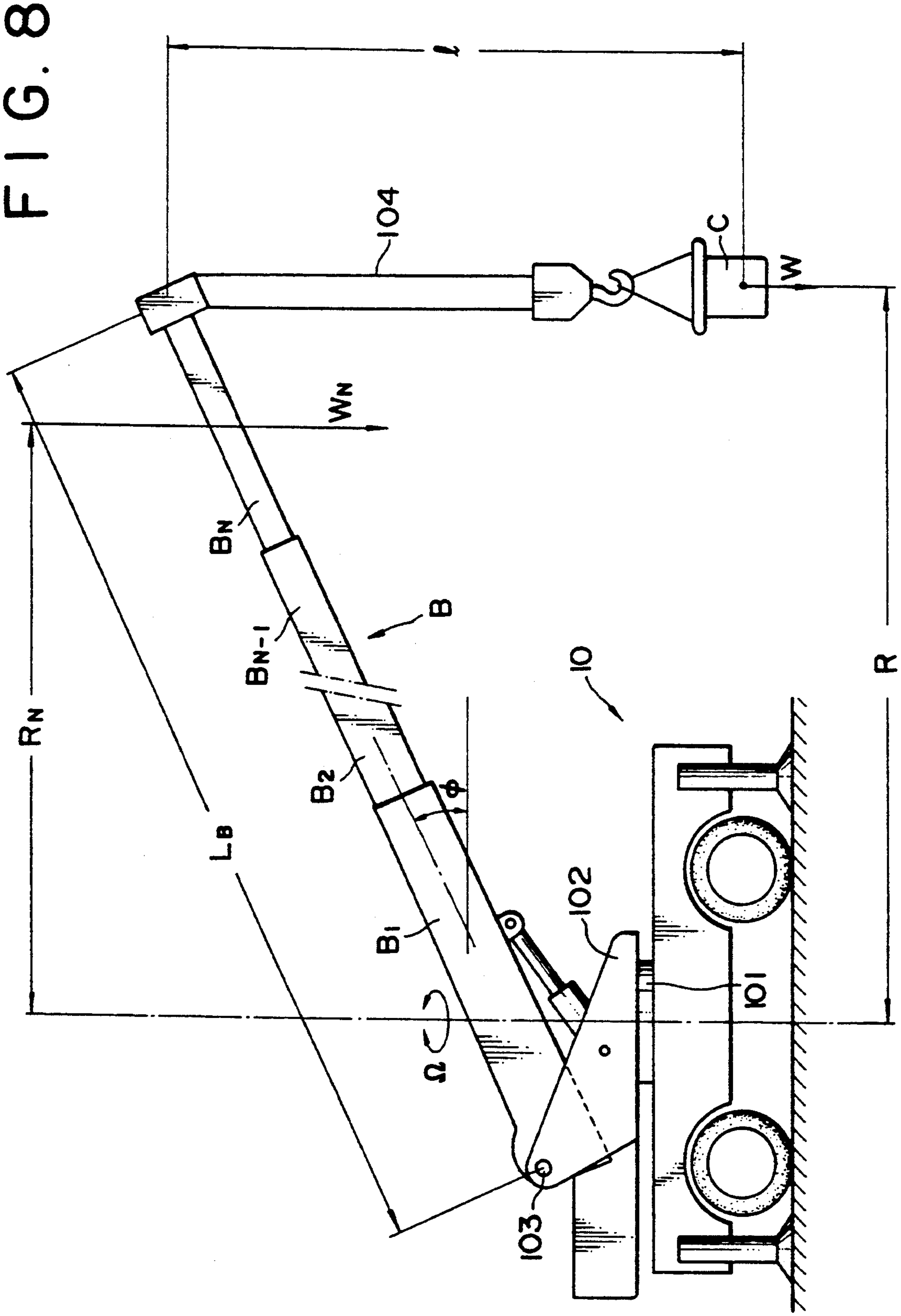
FIG. 8 is a side view of a crane provided with the control apparatus shown in FIG. 1.

A crane 10 shown in FIG. 8 is provided with a boom foot (which constitutes an upper slewing body) 102 slewingable around a vertical slewing shaft 101, and an expansible boom (which constitutes an upper slewing body) B composed of N numbers of boom members $B_1$ to $B_N$ is mounted on the boom foot 102. This boom B is designed to be rotatable (capable of being raised and fallen) around a horizontal rotating shaft 103, and a hoisting load C is hoisted on the extreme end (boom point) of the boom B. It is noted that, in the following description, Bn (n=1, 2,. . . N) indicates the n-th boom member counted from the boom foot 102 side.

Figure 1:
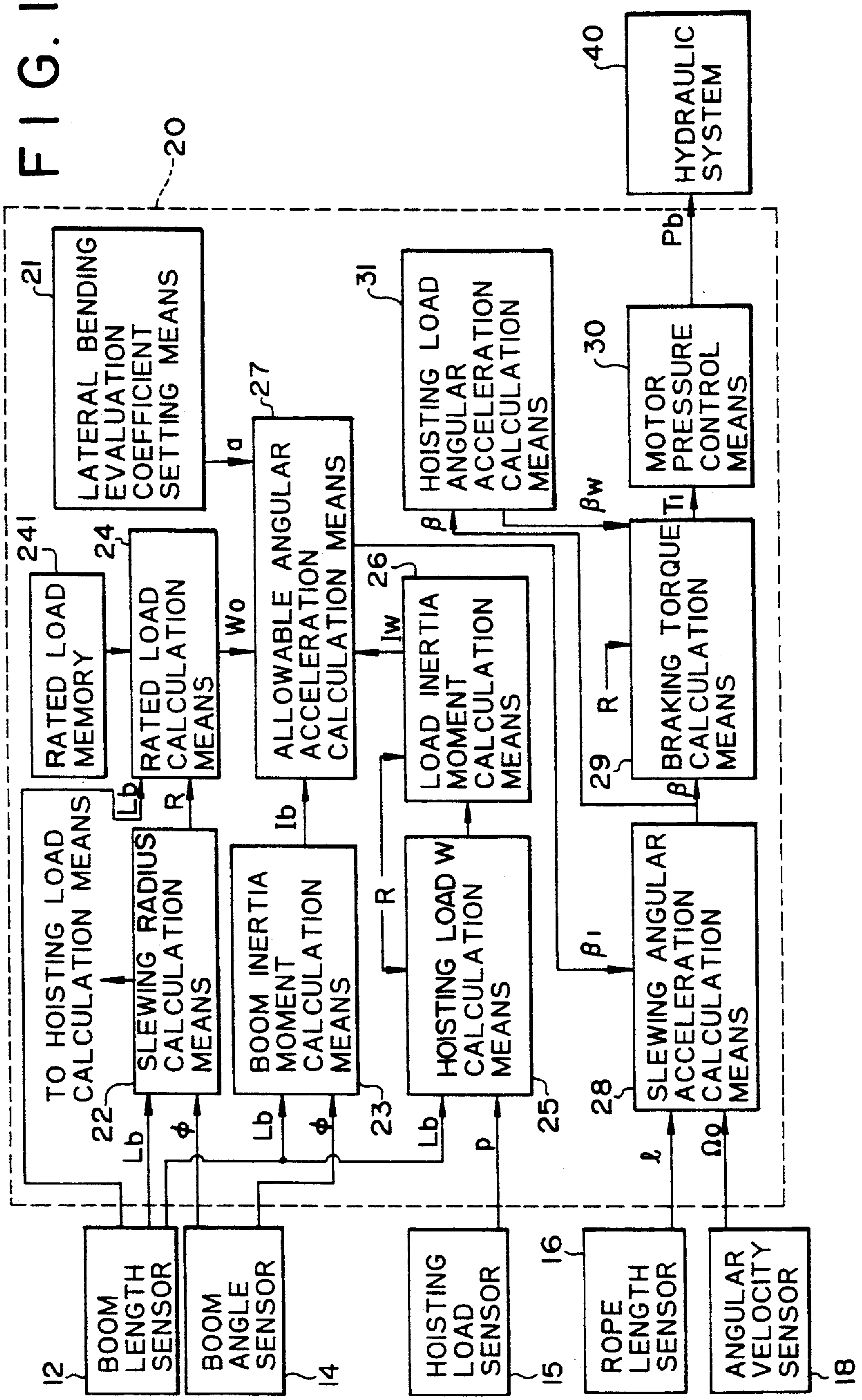
FIG. 1 is a functional structural view of an apparatus for controlling a slewing stop of a crane in the exemplary embodiment according to the present invention.

As shown in FIG. 1, this crane is provided with a boom length sensor 12, a boom angle sensor 14, a hoisting load sensor 15, a rope length sensor 16, an angular velocity sensor 18, an arithmetic control device 20 and a slewing drive hydraulic system 40.

The arithmetic control device 20 comprises a lateral bending evaluation coefficient setting means 21, a slewing radius calculation means 22, a boom inertia moment calculation means 23, a rated load calculation means 24, a hoisting load calculation means 25, a load inertia moment calculation means 26, an allowable angular acceleration calculation means 27, a slewing angular acceleration calculation means 28, a braking torque calculation means 29, a motor pressure control means 30 and a hoisting load acceleration calculation means 31, wherein the upper slewing body is controlled to be braked and stopped without leaving an oscillation of the hoisting load C in consideration of the lateral bending load generated in the boom B during the slewing braking.

More specifically, the lateral bending evaluation coefficient setting means 21 sets the evaluation coefficient with respect to the lateral bending strength of the boom B.

The slewing radius calculation means 22 calculates the slewing radius R of the hoisting load C according to the boom length LB and the boom angle $\phi$ detected by the boom length sensor 12 and the boom angle sensor 14, respectively.

The boom inertia moment calculation means 23 calculates inertia moments In of the respective boom members Bn according to the boom length Lb and the boom angle $\phi$ and also calculates an inertia moment Ib of the whole boom B.

The rated load calculation means 24 calculates a rated load $W_o$ from the data stored in a rated load memory 241 according to the slewing radius R calculated by the slewing radius calculation means 22 and the boom length Lb.

The hoisting load calculation means 25 calculates an actual hoisting load W according to the pressure "p" of a boom raising and falling hydraulic cylinder detected by the hoisting load sensor 15, the slewing radius R calculated by the slewing radius calculation means 22 and the boom length Lb.

The load inertia moment calculation means 26 calculates an inertia moment Iw of a load (hoisting load C) according to the hoisting load W calculated by the hoisting load calculation means 25 and the slewing radius R.

The allowable angular acceleration calculation means 27 calculates an allowable angular acceleration $\beta_1$ on the basis of the lateral bending strength of the boom B from the load inertia moment Iw, the boom inertia moment Ib, the rated load Wo and the lateral bending evaluation coefficient $\alpha$ of the boom B.

The slewing angular acceleration calculation means 28 calculates a slewing angular acceleration $\beta$ for actually braking and stopping the slewing according to an oscillating radius l of the hoisting load C obtained from the result detected by the rope length sensor 16, a slewing angular velocity $\Omega$ of the boom B detected by the angular velocity sensor 18 and the allowable angular acceleration $\beta_1$.

The hoisting load angular acceleration calculation means (which constitutes a part of the hoisting load braking torque calculation means) 31 momentarily calculates an angular acceleration $\beta w$ of the hoisting load C when the upper slewing body is braked at the slewing angular acceleration according to the oscillating state of the hoisting load C during the slewing braking. It is noted that, in this embodiment, as described hereinafter, the oscillating state of the hoisting load C is obtained by the arithmetic operation on the basis of the theoretical formula.

Figure 2:
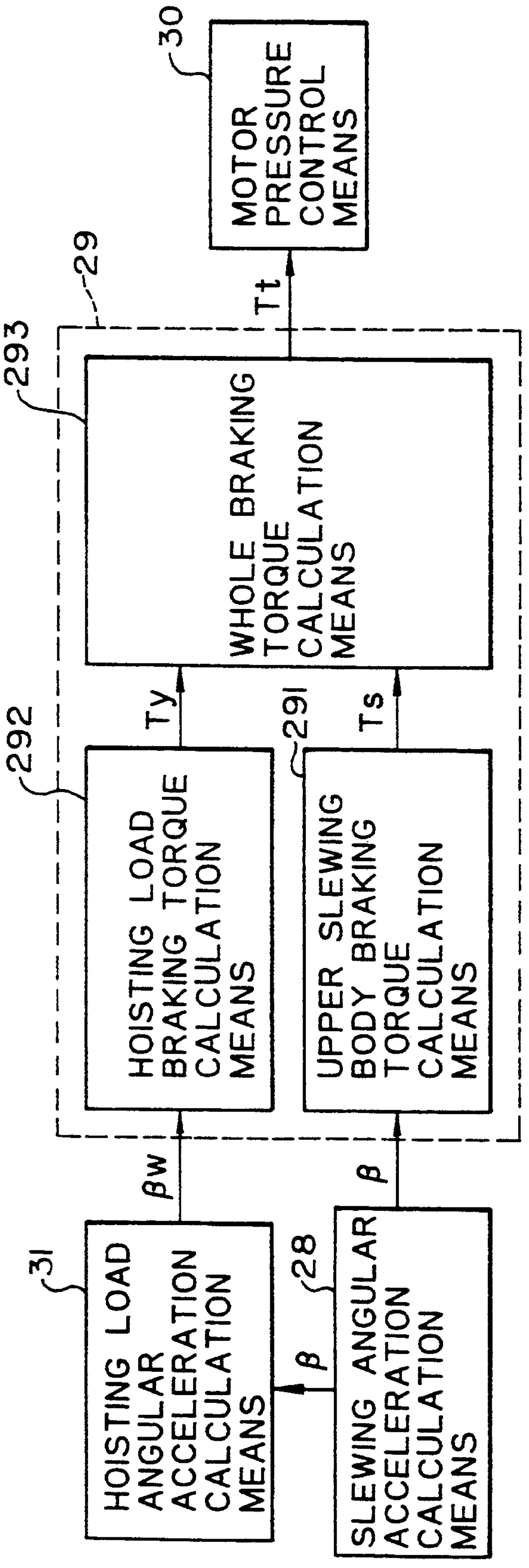
FIG. 2 is a functional structural view of a braking torque calculation means in the control apparatus shown in FIG. 1.

The braking torque calculation means 29 has such a functional structure as shown in FIG. 2 to momentarily calculate a braking torque required to brake the upper slewing body according to the slewing angular acceleration and the angular acceleration $\beta w$ of the hoisting load C.

In FIG. 2, the upper slewing body braking torque calculation means 291 calculates an upper slewing body braking torque Ts required to brake the upper slewing body including the boom B at the slewing angular acceleration $\beta$. The hoisting load braking torque calculation means 292 calculate, according to the angular acceleration $\beta w$ of the hoisting load C momentarily calculated by the hoisting load angular acceleration calculation means 31, a braking torque Tw of the hoisting load C required at each time. The whole braking torque calculation means 293 momentarily calculates the sum of the upper slewing body braking torque Ts and the hoisting load braking torque Tw. The resultant value is set as the whole braking torque Tt required to brake the upper slewing body to output a set signal to a motor pressure control means 30.

The motor pressure control means 30 sets a braking pressure Pb of a hydraulic motor corresponding to the whole braking torque Tt to output a control signal to the hydraulic system 40.

Subsequently, the arithmetic and control contents actually executed by the arithmetic control device 20 will be described.

The slewing radius calculation means 22 first determines a slewing radius R' without taking account of a flexure of the boom B and a radius increment $\Delta R$ caused by the flexure of the boom B from the boom length Lb and the boom angle $\phi$, and calculates the slewing radius R therefrom.

The boom inertia moment calculation means 23 calculates inertia moments In of the respective boom members Bn, and further calculates the inertia moment Ib $$\left( = \sum_{n=1}^{N} In \right)$$

of the whole boom B as the sum thereof. The inertia moment In of each boom member Bn is determined by the following formula.

$$In = Ino \cdot \cos^2\phi + (Wn/g) \cdot Rn^2$$

, wherein Ino represents the inertia moment (constant) around the center of gravity of each boom member Bn in the state of $\phi=0$, Wn the dead weight of each boom member Bn, "g" the gravity acceleration, and Rn the slewing radius of gravity of each boom member Bn.

On the other hand, the load inertia moment calculation means 26 calculates a load inertia moment Iw according to the hoisting load W and the slewing radius R. More specifically, the load inertia moment Iw is expressed by the following formula.

$$Iw=(W/g)R^2$$

According to the data thus calculated, the allowable angular acceleration calculation means 27 determines the allowable angular acceleration $\beta_1$ as follows.

In general, the boom B and the boom foot 102 of the crane 10 has a sufficient strength. However, when the boom length Lb becomes long, a large lateral bending force acts on the boom B due to the inertia force generated during the slewing braking. The burden in terms of strength caused by the lateral bending force is maximum in the vicinity of the boom foot 102. Here, the evaluation of strength is performed on the basis of moment around the slewing shaft 101.

More specifically, let $\beta'$ be the angular acceleration of the boom B during the slewing braking, $\beta w'$ be the angular acceleration of the hoisting load C, and Iu be the moment around the slewing shaft of all constituent elements (such as the boom foot 102) of the upper slewing body other than the boom B, the moment Nb acting around the slewing shaft 101 due to the above-mentioned slewing is given by $$Nb=Iw\,\beta w'+(Ib+Iu)\beta' \quad (1)$$

On the other hand, the allowable condition with respect to the lateral bending strength of the boom B is given by the following formula.

$$Nb/R \leqq \alpha Wo \quad (2)$$

Substituting the formula (1) in the formula (2), $$\{Iw\,\beta w'+(Ib+Iu)\,\beta'\}/R \leqq \alpha Wo \quad (3)$$

On the other hand, in the case that the upper slewing body is braked at the angular acceleration $\beta'$ (the procedure for calculation thereof will be described hereinafter) without leaving the oscillation of the load in the state where both the upper slewing body and the hoisting load C are slewed at the angular velocity $\Omega o$ without the oscillation of the hoisting load C, the relationship between the angular acceleration $\beta w'$ of the hoisting load C and the angular acceleration $\beta'$, is obtained in the following procedure.

Figure 4:
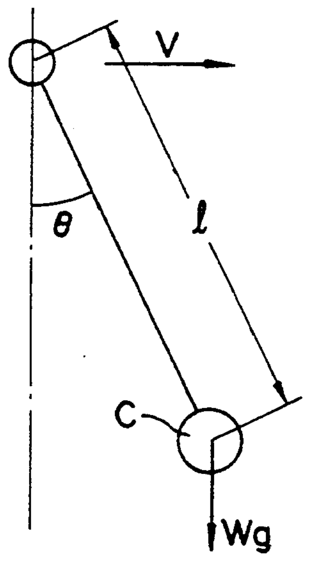
FIG. 4 is an explanatory view showing a state of a hoisting load as a single pendulum.
Figure 5:
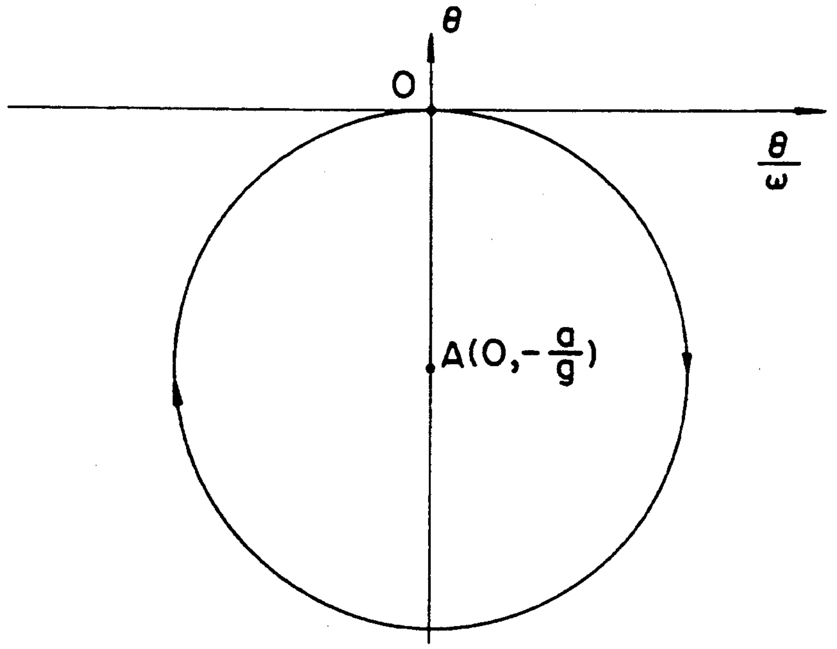
FIG. 5 is a graph showing a formula related to an oscillating angle and an oscillating speed of the hoisting load in a phase space.

As the hoisting load C, a model of a pendulum as shown in FIG. 4 is taken into consideration. Since a reversed inertia force acts on the hoisting load C during the slewing acceleration or deceleration, the following formula is obtained.

$$\ddot{\theta}+(g/l)\theta=-\dot{V}/l \quad (4)$$

, wherein $\theta$ represents the oscillating angle of the hoisting load C, l the length of a rope, and V the slewing speed of the boom top.

Let "a" ($a<0$ at the time of braking) be the acceleration of the boom top, $$V=Vo+a\,t \quad (5)$$

, wherein Vo represents the slewing speed ($=R\cdot\Omega o$) of the boom top before braking. Substituting the differentiated formula (5) in the formula (4), $$\ddot{\theta}+(g/l)\theta=-a/l$$

From the above differential equation, the following formulas are obtained.

$$\theta=A\cdot\cos\omega t+B\cdot\sin\omega t-a/g \quad (6)$$

$$\dot{\theta}=-A\omega\cdot\sin\omega t+B\omega\cdot\cos\omega t \quad (7)$$

, where $\omega=\sqrt{g/l}$. Applying the initial condition ($t=0$, $\theta=0$, and $\theta=0$) to the above formulas, $$\theta=(a/g)\cdot(\cos\omega t-1)$$

$$\dot{\theta}=-(\omega/g)\cdot\sin\omega t$$

$$\ddot{\theta}=-(a\omega^2/g)\cdot\cos\omega t$$

Thus, the displacement "u", speed and "u" and acceleration "u" in the slewing direction of the hoisting load C are obtained as follows:

$$u=\theta\cdot l=(al/g)\cdot(\cos\omega t-1)=(a/\omega^2)\cdot(\cos\omega t-1)$$

$$\dot{u}=\theta\cdot l=-(a\omega l/g)\cdot\sin\omega t=-(a/\omega)\cdot\sin\omega t$$

$$\ddot{u}=\theta\cdot l=-(a\omega^2 l/g)\cdot\cos\omega t=-a\cdot\cos\omega t$$

The obtained acceleration "ü" is the relative acceleration of the hoisting load C with respect to the upper slewing body, and therefore, the absolute acceleration (i.e., acceleration with respect to the ground) "aw" of the hoisting load C is expressed by $$aw=a+\ddot{u}=(1-\cos\omega t)\,a$$

Substituting $aw=\beta'R$, and $a=\beta'R$ in the formula, $$\beta w'=(1-\cos\Omega t)\beta' \quad (6)$$

Figure 6:
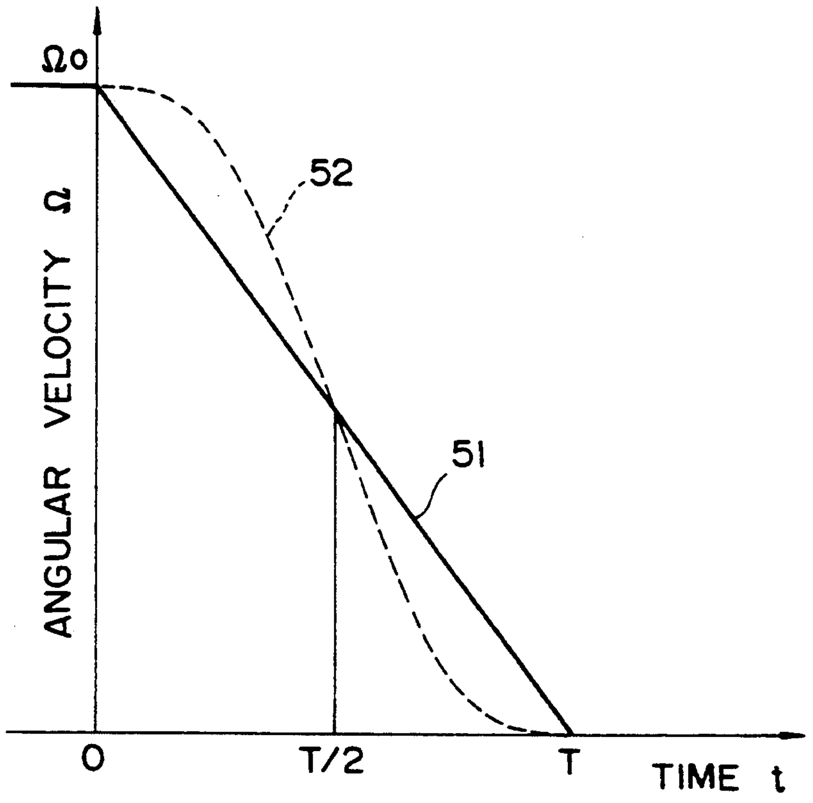
FIG. 6 is a graph showing the characteristics of changes of angular velocity of a hoisting load and angular velocity of a boom.

In FIG. 6, the angular velocity $\Omega$ of the boom B and the angular velocity $\Omega w$ of the hoisting load C obtained according to the formula (6) are indicated at the solid lines 51 and 52, respectively, in the case that the vibration mode number is 1. In this figure, the angular velocity $\Omega w$ of the hoisting load C shows a vibration with one period until the complete stop, and after the elapse of time $t=T/2$ since the start of braking, the angular acceleration $\beta w'$ of the hoisting load C becomes twice the angular acceleration $\beta'$ of the boom B.

On the other hand, in the case that the vibration mode number is n ($\geqq 2$), the angular velocity $\Omega w$ of the hoisting load C shows a vibration with n-periods during the slewing braking. However, the minimum value (the maximum value if an absolute value is taken) of the angular acceleration $\beta w'$ of the hoisting load C is also $2\beta'$. Theoretically, the value never exceeds $2\beta'$.

Accordingly, in this embodiment, a coefficient K, being set at more than 2 in consideration of a safety factor, is introduced and the arithmetic operation proceeds with $\beta w' = k\beta'$.

Substituting the equation of $\beta w' = k\beta'$ in the above formula (3), $$\{(W/g)\, R\cdot k\beta' + (Ib = Iu)\beta'\}/R \leqq aWo \tag{7}$$

The maximum angular acceleration $\beta'$ in the formula (7) is set as the allowable angular acceleration $\beta_1$.

The slewing angular acceleration calculation means 28 calculates the actual slewing angular acceleration $\beta$ in the following procedure according to the allowable angular acceleration $\beta_1$ calculated in the manner as described above and the load oscillating radius l and the boom angular velocity $\Omega_o$ (angular velocity before deceleration) obtained from the results detected by the rope length sensor 16 and the angular velocity sensor 18.

As the hoisting load C, a model of the same single pendulum as that shown in FIG. 4 is taken into consideration. Then, a differential equation of this system is expressed as follows.

$$\ddot{\theta} + (g/l)\theta = -\dot{V}/l \tag{4}$$

$$V = Vo + at \tag{5}$$

Both sides of the formula (5) are differentiated by time "t", and the resultant value is substituted in the right side of the formula (4), which is then integrated under the initial condition (at $t=0$, $\theta=0, \dot{\theta}=0$), thus obtaining the following formula.

$$(\dot{\theta}/\psi)^2 + (\theta + a/g)^2 = (a/g)^2$$

, where $\omega = \sqrt{g/l}$.

When this formula is expressed on a phase plane in connection with and $\theta/\omega$ and $\theta$, a circle is depicted which passes through an original point O (0, 0) around a point A (0, $-a/g$). A time required to make a round of this circle, that is, a period T in which the pendulum moves from the original point O and then returns to its original state is given by $T = 2\pi/\omega$, and therefore, if the angular acceleration $\beta$ is set so as to completely stop after the time nT (n is a natural number) from the time (O point) at which the slewing stop control of a crane starts, the stop control of a crane without leaving an oscillation of a load is realized. Since $\omega$ is a constant value determined by the gravity acceleration "g" and the oscillating radius "l", the above angular acceleration $\beta$ is obtained by $$\begin{aligned} \beta &= -\Omega o/nT \\ &= -\omega\Omega o/2n\pi (n \text{ is a natural number}) \end{aligned} \tag{8}$$

On the other hand, the allowable condition of the lateral bending strength of the boom B is $|\beta| \leqq \beta_1$, and therefore, the minimum natural number "n" in the range of fulfilling the above allowable condition is selected whereby the slewing angular acceleration $\beta$ for braking and stopping the slewing without leaving the oscillation of the load at the minimum time can be obtained.

Figure 3:
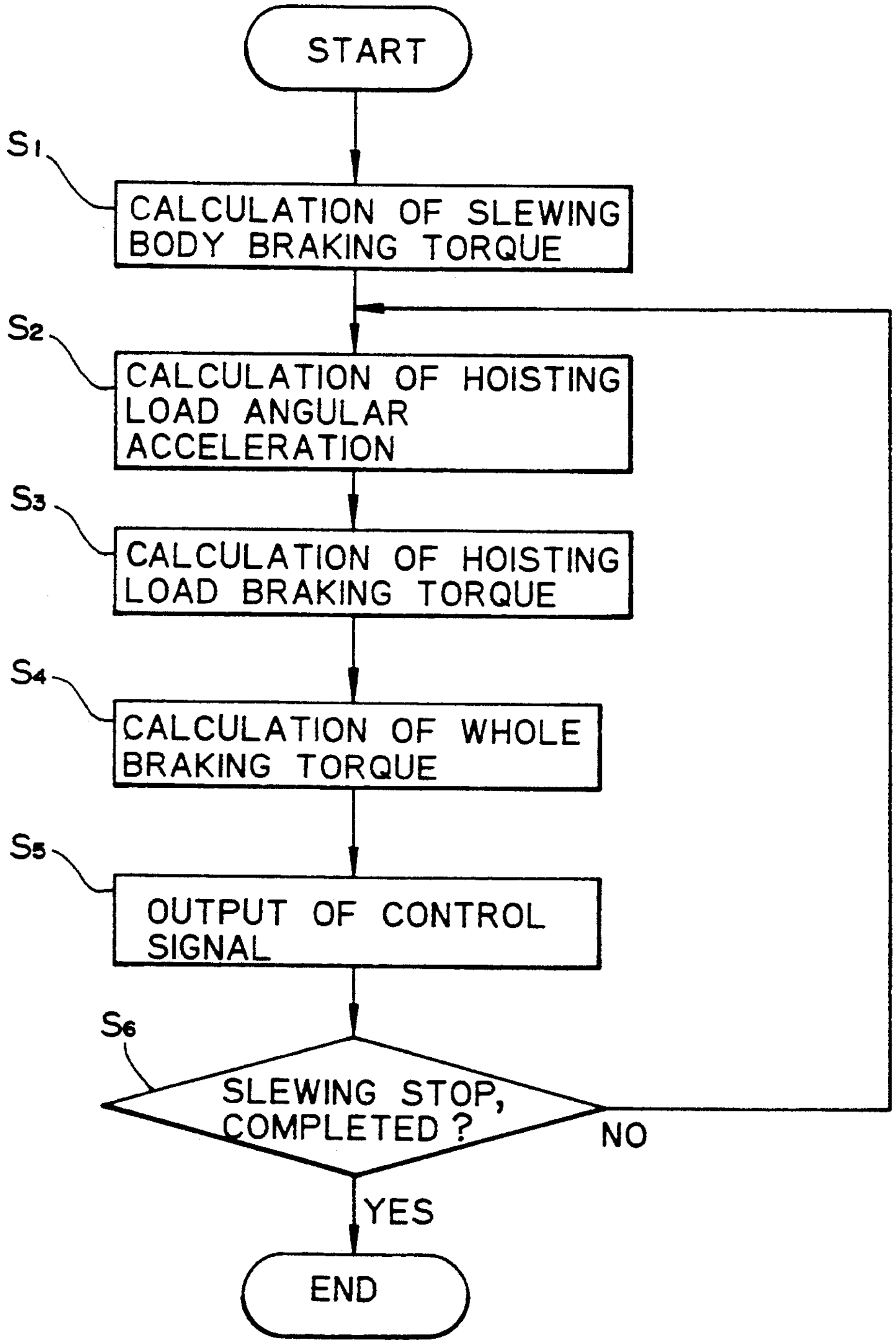
FIG. 3 is a flowchart showing the arithmetic operation of the braking torque by the braking torque calculation means shown in FIG. 2.

The braking torque calculation means 29 and the hoisting load angular acceleration calculation means 31 calculate torques required to brake the upper slewing body at the slewing angular acceleration $\beta$. This calculation procedure will be described with reference a flowchart of FIG. 3.

First, the upper slewing body braking torque calculation means 291 in the braking torque calculation means 29 calculates a braking torque Ts required to brake the main body of the upper slewing body at the slewing angular acceleration $\beta$ (Step $S_1$). This upper slewing body braking torque Ts is obtained by $$Ts = |(Ib + Iu)\beta| \tag{9}$$

On the other hand, the hoisting load angular acceleration calculation means 31 calculates the angular acceleration $\beta w$ of the actual hoisting load C in case of braking at the slewing angular acceleration $\beta$ (Step $S_2$). The formula for obtaining the hoisting load angular acceleration $\beta w$ is similar to the formula (6) and is expressed by $$\beta w = (1 - \cos \omega t)\beta \tag{10}$$

The hoisting load braking torque calculation means 292 calculates a braking torque Tw required to brake the hoisting load C according to the hoisting load angular acceleration $\beta w$ (Step $S_3$). This hoisting load braking torque Tw is obtained by $$Tw = |(W/g)R^2\beta w| \tag{11}$$

The whole braking torque calculation means 293 calculates the sum of the upper slewing body braking torque Ts and the hoisting load braking torque Tw as the whole braking torque Tt (Step $S_4$) to output it to the motor pressure control means 30.

The motor pressure control means 30 sets the braking side pressure Pb of the hydraulic motor corresponding to the whole braking torque Tt to output a control signal on the basis of the braking side pressure Pb.

Figure 7:
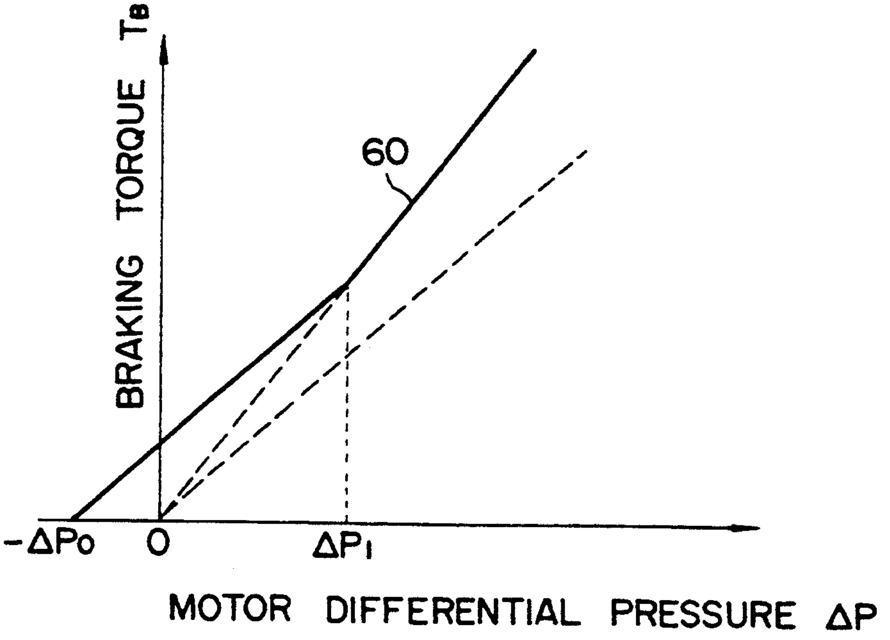
FIG. 7 is a graph showing a relationship between a differential pressure of a hydraulic motor and a braking torque.

In this embodiment, there is a relationship, as shown by the solid line 60 in FIG. 7, between the whole braking torque Tt and the differential pressure $\Delta P$ of the hydraulic motor, as expressed by the following formula.

i) In case of $-\Delta P_o \leqq \Delta P < \Delta P_1$ $$Tt = (\Delta P + \Delta Po)\cdot Q_H/200\pi \tag{12}$$

ii) In case of $\Delta P \geqq \Delta P_1$ $$Tt = (\Delta P \cdot Q_H/200\pi)\cdot i_o \cdot \eta m \tag{13}$$

, wherein $Q_H$: capacity of motor $i_o$: total reduction ratio $\eta m$ : mechanical efficiency $\Delta Po$ : loss pressure of motor at no-load The motor differential pressure $\Delta P_1$ indicates the value of $\Delta P$ at an intersection between a straight line expressed by the formula (12) and a straight line expressed by the formula (13).

Accordingly, substituting the whole braking torque Tt in the formula (12) or (13), then the differential pressure $\Delta P$ of the hydraulic motor for obtaining the braking torque Tt can be obtained.

Furthermore, let Pa be the drive side pressure of the hydraulic motor, the braking side pressure Pb of the hydraulic motor can be obtained by $$Pb = Pa + \Delta P \quad (14)$$

The operations of Steps $S_2$ to $S_5$ are executed every constant control termination until the slewing stop is completed (Step $S_6$) whereby the high accurate slewing stop control in consideration of the oscillation of a load during the slewing braking can be realized, and the upper slewing body can be reliably stopped without leaving the oscillation of the hoisting load C.

The present invention is not limited to the above-mentioned embodiment and the following mode, for example, can be employed.

(1) While in the above-mentioned embodiment, the angular acceleration $\beta w$ of the hoisting load is obtained from the theoretical formula, and the hoisting load braking torque Tw is calculated on the basis thereof, it is to be noted that the present invention is not limited thereto and the oscillating state (such as the oscillating angle $\theta$) of the hoisting load C during the slewing braking, for example, is momentarily detected by a sensor, and the hoisting load braking torque Tw is obtained from the detected result.

The concrete arithmetic operation is shown below. Let "m" (=W/g) be the mass of the hoisting load C, the relationship between the oscillating angle $\theta$ of the hoisting load C and the acceleration "aw" in the slewing direction of the hoisting load C is given by $$\tan\theta = maw/mg = aw/g$$

Since $\theta$ is small, then $$\tan\theta \simeq \theta$$

Accordingly, $$\theta = aw/g$$

$$\therefore aw = g\theta \quad (15)$$

Substituting the formula (15) and $aw = R\beta w$ in the formula (11), then $$Tw = |(W/g)\,R\theta| \quad (16)$$

The hoisting load braking torque Tw can be obtained on the basis of the oscillating angle $\theta$ from the formula (16).

Thus, the oscillating state of the hoisting load is detected by the sensor or the like and the slewing stop control is performed on the basis thereof, and therefore, the slewing stop control with high accuracy in well conformity with the actual circumstances can be realized. In the case of calculating the hoisting load braking torque using the theoretical formula as in the above-mentioned embodiment, a sensor is not required, thus providing the merit that the above-mentioned effect is obtained at low cost.

(2) In the present invention, the braking torque of the upper slewing body and the hoisting load is obtained on the basis of a common angular acceleration similarly to the prior art, and a torque correction amount in consideration of the oscillation of the hoisting load is calculated separately therefrom so as to obtain the sum of both. Also in this case, by the addition of the torque correction amount, the hoisting load braking torque is obtained as a result, thus obtaining the effect similar to that of the above-mentioned embodiment.

(3) The present invention may be applied to such a construction machine irrespective of kind thereof, that is provided with a slewingable upper slewing body which hoists a load at a predetermined position. The slewing drive means employed includes a hydraulic or electric means, and the braking torque is calculated by the procedure noted above to thereby realize the high accurate control in consideration of the oscillation of the load during the slewing braking.

What is claimed is:

1. A method for controlling a slewing stop of an upper slewing body which is slewingably provided on a construction machine and hoists a load at a predetermined position, the method comprising the steps of:
   - calculating a slewing angular acceleration for realizing a desired control of the slewing stop,
   - calculating a braking torque of the upper slewing body required for braking the upper slewing body based on said slewing angular acceleration,
   - calculating a hoisting load braking torque required for braking the hoisting load based on said slewing angular acceleration and an oscillating state of the hoisting load during the slewing braking, and
   - applying a brake based on both the upper slewing body braking torque and the hoisting load braking torque.

2. An apparatus for controlling a slewing stop of an upper slewing body which is slewingably provided on a construction machine and hoists a load at a predetermined position, the apparatus comprising:
   - a slewing angular acceleration calculation means for calculating a slewing angular acceleration for realizing a desired control of the slewing stop,
   - a braking torque calculation means for calculating a braking torque based on said slewing angular acceleration, and
   - control means for performing a control of the slewing stop of the upper slewing body based on said braking torque,
   - wherein said braking torque calculation means comprises an upper slewing body braking torque calculation means for calculating a braking torque of the upper slewing body required for braking the upper slewing body based on said slewing angular acceleration, a hoisting load braking torque calculation means for calculating a hoisting load breaking torque required for braking the hoisting load based on said slewing angular acceleration and an oscillating state of the hoisting load during the slewing braking, and a total braking torque calculation means for calculating an actual braking torque based on both the upper slewing body braking torque and the hoisting load braking torque.

* * * * *